Sept. 13, 1960 J. I. FRANKE 2,952,804

PLANE CONCENTRIC FIELD-EFFECT TRANSISTORS

Filed Aug. 26, 1959 2 Sheets-Sheet 1

INVENTOR
JOACHIM IMMANUEL FRANKE
BY
Abraham A. Saffitz
ATTORNEY

PLANE CONCENTRIC FIELD-EFFECT TRANSISTORS

Filed Aug. 26, 1959 2 Sheets-Sheet 2

INVENTOR
JOACHIM IMMANUEL FRANKE
BY
Abraham A. Saffitz
ATTORNEY 2,952,804

PLANE CONCENTRIC FIELD-EFFECT TRANSISTORS

Joachim Immanuel Franke, 56 Ave. du Parc Montsouris, Paris, France

Filed Aug. 26, 1959, Ser. No. 836,202
Claims priority, application France Aug. 29, 1958
2 Claims. (Cl. 317—235)

The present invention relates to improvements in field-effect transistors and more particularly in transistors of this kind in the form of a plate and having electrodes of revolution about the axis of the plate, and in the methods of manufacturing the same. These transistors will be called hereinafter "plane concentric field-effect transistors."

It is known that, in a field-effect transistor, the effects of control and of amplification are produced by means of carriers of a single sign, namely the majority carriers, which are subjected to the action of an electric modulating field. The field-effect transistors therefore differ from the bipolar transistors in which the movement of the minority carriers plays a predominant part.

In the article entitled "A unipolar field-effect transistor," which appeared in the review "Proceedings of the Institute of Radio Engineers," volume 40, November 1952, pages 1365 to 1376, W. Shockley, has described the first known unipolar field-effect transistor structure. He has also shown that the operation and the characteristics of such a transistor are very much like those of a vacuum tube of the pentode type.

Other field-effect transistor structures, inspired by the Shockley structure, were proposed later. The majority of these structures aimed at improving the low-power field-effect transistors. The principal improvements aimed at are, on the one hand, the increase of the power and, on the other hand, the increase of the transconductance of the current-voltage characteristic as well as the increase of the value of the amplification and oscillation limit frequency.

Among the known prior art structures deduced from the Shockley structure, may be noted that described in German Auslegeschrift No. 1,034,272, applied for in Germany August 17, 1955, opened for inspection in Germany July 17, 1958, this application in Germany filed in the name of General Motors Corporation, Detroit, Michigan, as assignee claiming a priority in the United States of August 17, 1954, and in the name of Edward George Roka, Kokomo, Indiana.

The field-effect transistors in this application are each constituted by a circular plate of semi-conductive material on the faces of which there are arranged electrodes having a geometric shape of revolution about the axis perpendicular to the faces of the said plate and passing through its center. One of the source or drain electrodes is annular, the other being circular; the gate electrode is annular. The result of this is that the line along which pinch-off occurs is a circle. The construction of these annular electrodes for field-effect transistors involves difficulties.

The object of the present invention is to render the manufacture of the above mentioned annular electrodes more simple. The proposed improvements render is possible, in addition, to make, in structures of field-effect transistors of the plane concentric kind, advantageous modifications which, in particular, appreciably improve the transconductance of the current-voltage characteristic of the said structures.

One of the annular electrodes which should be constructed with the greatest care is that which is constituted by the gate. It is, in fact, known that the gate should have a rectifying contact with the semi-conductor or form a n-p junction therewith.

The annular gate is obtained by making a circular cavity or ditch in the semi-conductive plate and filling the bottom of this ditch with a metallic deposit which forms a rectifying contact with the semi-conductor. If, for example, the semi-conductive body is n-type germanium, the ditch may be hollowed out by electrolytic etching and the metallic deposit, for example of indium, may also be made by electroplating.

The formation of the said ditch by electrolysis involves difficulties which are due to the following reasons:

(*a*) The electrolytic etching should be controlled in such a manner that the depth of the circular ditch is strictly the same to a few microns, for all the cross-sections of the said ditch. The regularity of this depth is very important because it is necessary that the bottom of the ditch should, at all points, remain at an equal distance from a reference plane constituted for example by a n-p junction.

(*b*) The electrolytic etching should be controlled in such a manner that the width of the circular ditch is as small as possible. In order to fix one's ideas, it is necessary that this width should remain near 20 microns. Unfortunately, it is difficult to prevent the widening of the ditch during the etching operation.

(*c*) In addition, it is necessary to try to diminish, as much as possible, the parasitic resistances in series which exist between the drain and source electrodes of the said transistor.

According to the invention, the reduction of the above mentioned difficulties of construction is obtained by arranging by diffusion, on the circular plate of germanium of the n-type, which is intended to constitute the transistor, a layer of germanium of the $n^+$-type, the symbol $n^+$ denoting a region which is relatively richer in impurities than the region of n-type germanium. The circular ditch which, in the case of the structures of the prior art, was hollowed out in n-type germanium, is, in the case of the structures according to the invention, hollowed out in the $n^+$-type germanium, the bottom of the ditch then being the junction plane between the $n^+$ and the n layers of the semi-conductive body.

In order to fix certain orders of magnitude, it should be noted that the plate of n-type germanium has a resistivity of between a few ohm.centimeters and a few tens of ohm.centimeters, whilst the $n^+$ region has a resistivity of between a few hundredths and a few thousandths of one ohm.centimeter.

This small resistivity of the $n^+$ medium is advantageous for the hollowing out of the ditch, because, in this medium, the speed of the elecrolytic etching is great. Moreover, this etching is practically or at least strongly slowed up as soon as it reaches the limiting plane common to the two media n and $n^+$.

It is thus easy to know exactly the depth of the circular ditch which is obviously equal to the thickness of the diffusion layer $n^+$. As is known, the latter can be determined with great accuracy. In addition, advantage is also taken of another property as regards the layer $n^+$, which, owing to the fact that it is obtained by diffusion from the surface, has a conductivity which decreases in depth, that is to say in the direction where the width of the ditch has to diminish (it is the width of the bottom of the ditch in the radial direction which is of interest for the pinch-off operation).

Other features of the invention will appear in the course of the following detailed description which relates to one of the embodiments of the invention and which will be given with reference to the accompanying drawings, of which Fig. 1 is a diagrammatic representation of the field-effect transistor devised by W. Shockley;

Figure 1:
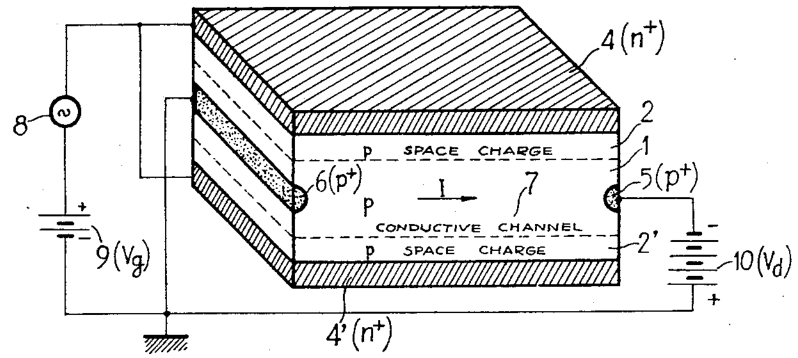

For a good understanding of the invention, there will be briefly recalled, with the aid of Fig. 1, the description and the operation of the field-effect transistor described by W. Shockley in the article which has hereinbefore been mentioned.

This transistor is constituted by a plate 1 of p-type germanium arranged between two layers 4 and 4' of $n^+$-type germanium. Of course, as in Figs. 2 and 3 which will be described hereinafter, it is possible to reverse the types of conductivity of the different parts of the transistor if the gate or gates is or are biased in the reverse sense in relation to the semi-conductive body.

The intermediate layer 1 carries, at the two ends, ohmic contacts 5 and 6 respectively of the $p^+$-type inlaid in the said layer 1. The contact 6, which is grounded and from which the carriers, which in this case are holes, start, is the source electrode. The contact 5 at which the carriers arrive, is the drain electrode. In this case, it is biased negatively in relation to the source electrode by means of the D.C. source 10.

The two side layers 4 and 4' are connected together by a wire and they form the gate of the field-effect transistor, which gate is biased by the D.C. source 9. It should be noted that the gate is biased positively in relation to the source electrode 6 since the semi-conductive body is of the p-type; it would be biased negatively in relation to the same source electrode if the semi-conductive body were of the n-type. Since the two gates 4 and 4' are oppositely biased in relation to the central region of the plate, a region of space charge is produced around the p-$n^+$ junctions. The said region extends almost entirely in the p-region which is much less conductive than the $n^+$-regions.

The voltage applied between the drain 5 and the source 6, which voltage is due to the current source 10, creates a longitudinal electric field in the germanium plate 1. This field gives rise to an electric current owing to the displacement of the holes which normally exist in the plate. This current can pass only in the central region 7 called "conductive channel," because the two end regions 2 and 2' of the plate 1 where the space charges exist, are entirely without free holes.

The cross-section of the conductive channel 7, which is utilisable for the passage of a current between the drain 5 and the source 6 and, consequently, the apparent resistance of the layer, thus vary with the thickness of the space-charge regions 2 and 2', that is to say with the voltage applied to the gate 4—4'. This voltage can therefore control the current which passes in the region 7 in the same way as the grid of an electronic tube controls the passage of the electrons between the cathode and the anode.

The current which passes in the gate circuit is very weak owing to the fact that the gate 4—4' is biased in the non-passing direction. The gain in power is therefore, as in the case of a tube, due to the fact that the control electrode has a very high impedance.

As is known, the field-effect transistor which has just been described is of a delicate construction. As a matter of fact, the thickness of the space-charge regions 2 and 2' is, at the most, only a few tens of microns; the result of this is that the thickness of the central region 7 must not exceed the order of magnitude of a hundred microns in order that the modulation of the section of this region may be appreciable.

The plate 1 of germanium, which, on the one hand, should be very thin while being of a practically uniform thickness and, on the other hand, should be constituted by a quasi-intrinsic semi-conductor which is covered on its two faces with semi-conductive layers of the opposite type that are rich in impurities, obviously raises certain difficulties of construction.

In addition, this field-effect transistor involves the risk that the space charge regions 2 and 2' may be short-circuited by the external surface, particularly at the end adjacent to the drain where there is a great difference of potential between the conductive channel 7 and the gate 4—4'. This risk is increased by the effect of the edges which gives rise to a concentration of the electric field.

Figures 2, 3:
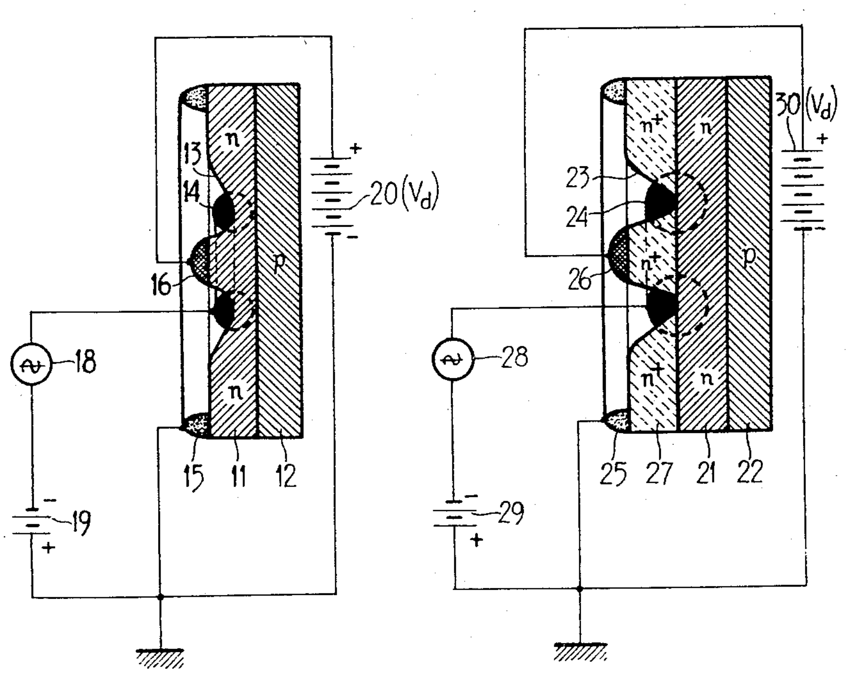
Fig. 2 is a diagrammatic representation of a field-effect transistor in accordance with the aforesaid U.S. application.
Fig. 3 is a diagrammatic representation of a field-effect transistor according to the invention.

The structure described in the aforesaid U.S. application, represented in Fig. 2, which is of an easier construction, palliates certain of the aforesaid drawbacks.

This structure is constituted by a thin plate of germanium, circular for example, having an n-p junction. The p-type region 12 is the thicker one in order to give rigidity to the plate, and the useful part 11 of n-type is very thin and has a thickness which should not exceed a few tens of microns. The thickness of the part 11 has been exaggerated in Fig. 2.

Hollowed out by electrolytic etching, in the outer side of the plate 11, is a circular ditch 13 in which a ring 14 of indium is arranged. The part of this ring, that is in contact with the n-type germanium of the plate 11, constitutes a rectifying contact.

The ring 14 is the gate of the field-effect transistor, which is biased in the reverse sense (that is to say, for germanium of the n-type, negatively in relation to the source electrode) by the D.C. source 19.

An electrode 16 is made from a deposit of $n^+$-type germanium on the central part of the plate 11. Such a junction behaves substantially as an ohmic contact and plays the part of a drain. This drain 16 is biased by the D.C. source 20.

Arranged on the peripheral part of the plate 11 is an annular electrode 15 of $n^+$-type germanium which is earthed and plays the part of a source electrode.

The operation of the structure shown in Fig. 2 is similar to that of the structure shown in Fig. 1. However, the potential barrier (shown dotted), which surrounds the junction of the gate 14, has an annular shape which renders it possible to eliminate its end effects mentioned in connection with the structure shown in Fig. 1.

On the other hand, the arrangement of the electrodes shown in Fig. 2 renders it possible to obtain a very small distance between the said electrodes; this considerably improves the electrical characteristics of the field-effect transistor considered.

The difficulties in making the gate 14 of the structure shown in Fig. 2 have already hereinbefore been indicated.

The structure according to the invention, represented in Fig. 3, comprises a circular plate 22 of germanium of the p-type, a thin part of which, that the useful part, has been doped into n-type germanium.

A deposit 27 of germanium of the $n^+$-type is arranged by diffusion on the outer side of the plate 21.

As has been already stated the principal feature of the invention is to hollow out electrolytically the circular ditch 23 in the layer 27 of germanium of the $n^+$-type, the bottom of the ditch being constituted by the bared surface of the junction between the layers 21 and 27.

Before etching, the transistor body is coated with an insulating varnish unattackable by the electrolyte. Through this varnish, there is traced with a sapphire stylus a circular line at the place the ditch has to be hollowed out. In the ditch (the varnish not being removed) a ring 24 of indium is deposited which constitutes the gate of the field-effect transistor, which gate is biased by the D.C. source 29.

An electrode 26 is made on the central part of the deposit 27 by means of a deposit of $n^{++}$-type germanium which is doped still more strongly than the part 27. This electrode 26 is the drain of the transistor; it is biased by the D.C. source 30.

Arranged on the peripheral part of the layer 27 is an annular electrode 25 of $n^{++}$-type germanium which is still more strongly doped than the part 27 and which is connected to ground and plays the part of source electrode.

The operation of the field-effect transistor of the invention is the same as that of the transistors of Figs. 1 and 2.

However, the field-effect is more pronounced in the transistor of the invention than in the Shockley structure and in the plane concentric structure. In fact, it is well known that the field effect modulation is stronger the greater the resistivity of the semi-conductor of the plate; the result of this is that the space-charge is greater in the n-type germanium of the plate 21 than in the $n^{+}$-type germanium diffused into the part 27. The shrinking of the "effective" length, in the radial direction, of the pinch-off neck between the limiting surface of the space-charge and the limiting plane constituted by the junction 21—22 is thus considerably favoured.

Figure 4:
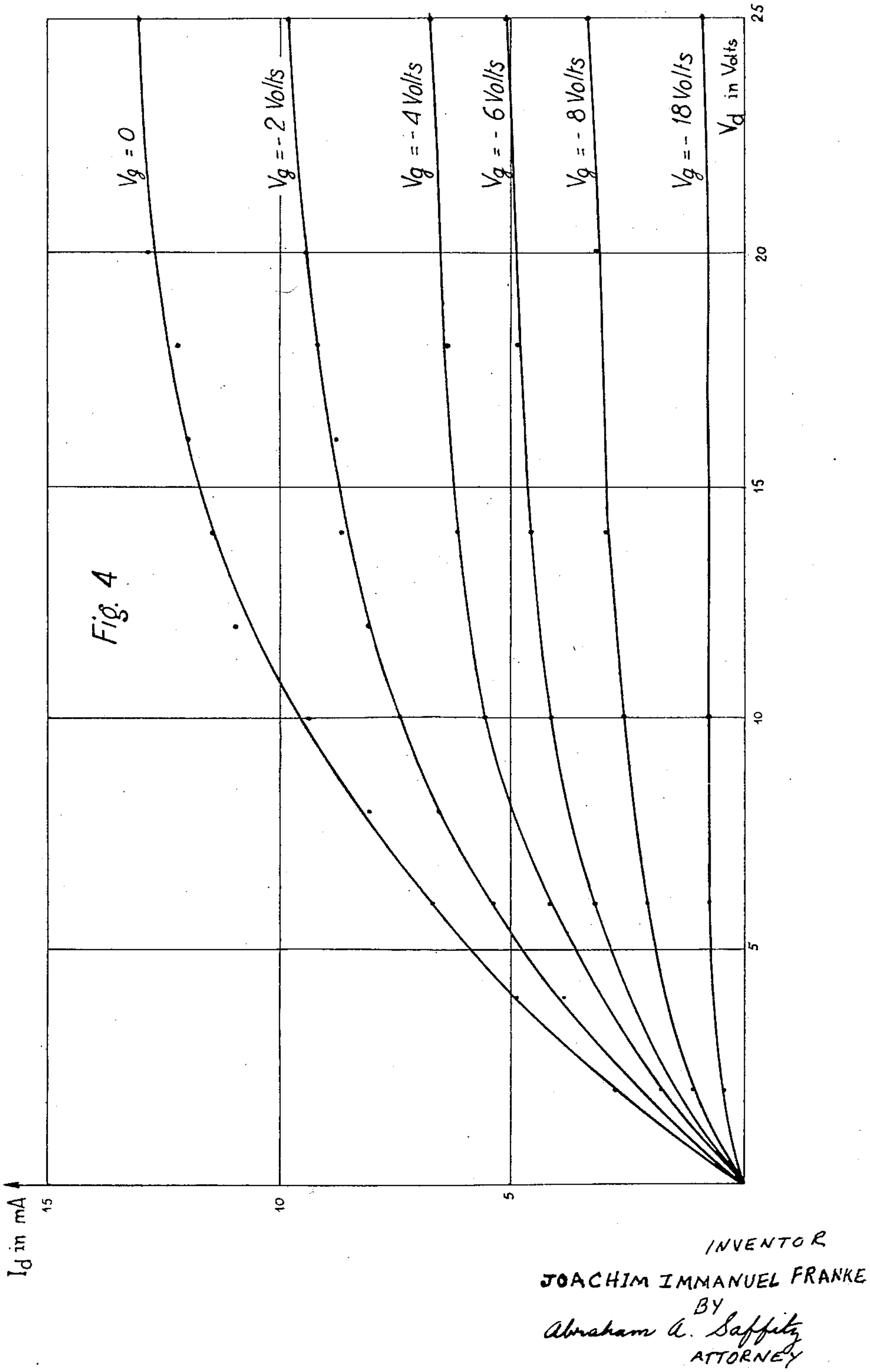
Fig. 4 represents the current-voltage characteristics of a field-effect transistor according to the invention.

Fig. 4 represents a group of current-voltage characteristics collected experimentally on a field-effect transistor according to the invention.

The drain voltage $V_d$ in volts has been shown on the axis of the abscissae; the drain current $I_d$ in milliamperes delivered by the transistor has been shown on the axis of the ordinates. Each characteristic has been drawn, giving the gate voltage $V_g$ a fixed value.

The principal dimensions of the transistor which was used for setting forth the characteristics of Fig. 4 are the following:

| | |
|---|---|
| Diameter of the transistor ____________millimeters__ | 5 |
| Thickness of the n-germanium ____________microns__ | 20 |
| Thickness of the $n^{+}$-germanium ____________do____ | 25 |
| Diameter of the internal circumference which bounds the circular ditch at the free surface of the $n^{+}$-germanium ____________millimeters__ | 2 |
| Width of the ditch at the free surface of the $n^{+}$-germanium ____________microns__ | 50 |
| Width of the annular surface of bared n-germanium at the bottom of the ditch ____________micron__ | 20 |

Naturally, the structure and the method which have been described in the case in which the transistor comprises only one annular gate also extend to the case of a transistor with two, three or more concentric annular gates.

What I claim is:

1. A field-effect transistor comprising a plate of semi-conductive material constituted by three contiguous plate-shaped regions, the first having a given type of conductivity, the second having the opposite type of conductivity and the third the same type of conductivity and a heavier doping than the second, a circular ditch hollowed out in said third region and having a bottom flush with and close to the limiting plane between the second and third regions, at least a circular metallic ring in said ditch having a rectifying contact with said third region and with said second region along said bottom of said ditch, and a disk-shaped and a ring-shaped ohmic electrode on the surface of said third region, concentric with said metallic ring.

2. A field-effect transistor comprising a plate of semi-conductive material constituted by three contiguous plate-shaped regions, the first having a given type of conductivity, the second having the opposite type of conductivity and the third the same type of conductivity and a heavier doping than the second, a circular ditch hollowed out in said third region and having a bottom flush with and close to the limiting plane between the second and third regions, at least a circular metallic ring in said ditch having a rectifying contact with said third region and with said second region along said bottom of said ditch, a circular semi-conductive disk at the center of said ring inlaid in said third region having a heavier doping than said third region and a circular semi-conductive ring concentric with and outer to said metallic ring, said disk and said semi-conductive ring having an ohmic contact with said third region.

References Cited in the file of this patent

UNITED STATES PATENTS

| | | |
|---|---|---|
| 2,597,028 | Pfann ____________ | May 20, 1952 |
| 2,764,642 | Shockley ____________ | Sept. 25, 1956 |
| 2,831,787 | Emeis ____________ | Apr. 22, 1958 |